(12) United States Patent
Satish et al.

(10) Patent No.: US 8,499,354 B1
(45) Date of Patent: Jul. 30, 2013

(54) PREVENTING MALWARE FROM ABUSING APPLICATION DATA

(75) Inventors: Sourabh Satish, Fremont, CA (US); William E. Sobel, Stevenson Ranch, CA (US)

(73) Assignee: Symantec Corporation, Mountain View, CA (US)

( * ) Notice: Subject to any disclaimer, the term of this patent is extended or adjusted under 35 U.S.C. 154(b) by 116 days.

(21) Appl. No.: 13/048,810

(22) Filed: Mar. 15, 2011

(51) Int. Cl.
*G06F 12/14* (2006.01)
*G06F 11/00* (2006.01)
*G06F 12/16* (2006.01)
*G08B 23/00* (2006.01)

(52) U.S. Cl.
USPC ............... 726/25; 726/22; 726/23; 726/27

(58) Field of Classification Search
None
See application file for complete search history.

(56) References Cited

U.S. PATENT DOCUMENTS

| | | | | |
|---|---|---|---|---|
| 5,974,549 | A | * | 10/1999 | Golan .............................. 726/23 |
| 7,814,544 | B1 | * | 10/2010 | Wilhelm ......................... 726/22 |
| 2004/0237071 | A1 | * | 11/2004 | Hollander et al. ............ 717/124 |
| 2006/0150256 | A1 | * | 7/2006 | Fanton et al. ................... 726/27 |

\* cited by examiner

*Primary Examiner* — Shin-Hon Chen
(74) *Attorney, Agent, or Firm* — Fenwick & West LLP

(57) ABSTRACT

An attempted exploit of a vulnerability of an application executed by a computer is detected. The exploit attempts to call an application programming interface (API) and abuse application data through a malicious parameter of the call. The API of the application is hooked and monitored for a call made to the hooked API. A parameter of the call is analyzed to determine whether the parameter has a malicious characteristic indicating an attempt to use data within an address space of the application to execute malicious software. A remediation action is taken responsive to determining that the parameter has a malicious characteristic.

19 Claims, 4 Drawing Sheets

PREVENTING MALWARE FROM ABUSING APPLICATION DATA

BACKGROUND OF THE INVENTION

1. Field of the Invention

This invention pertains in general to computer security and in particular to detecting attempted exploits of vulnerabilities of applications and other programs executing on a computer.

2. Description of the Related Art

Applications executed on modern computers are often susceptible to a wide variety of attacks. Web browsers, for example, are particularly susceptible to attacks because browsers receive large amounts of content from the Internet. Other types of applications are also vulnerable. For example, email programs and even word processors provide interfaces that are vulnerable to attack.

Malicious attackers can compromise such applications by crafting specially-formulated inputs that exploit vulnerabilities in the applications. Such an input contains data that, when received by an application, gives the attackers control over the application and allows them to perform malicious acts such as capturing keystrokes, sending messages on the network, deleting files, installing malicious software (malware) such as spyware and adware, etc. Specifically, this type of attack exploits an application's vulnerability in order to inject or otherwise write malicious code into the application's address space. The application then executes the malicious code and gives the attacker control of the application.

To stop these sorts of attacks, modern security products monitor address spaces used by applications to detect behaviors that signify malicious code being written to the address space. Attackers have thus turned to new techniques that use data already present in an application's address space to carry out an attack. Since these new techniques do not write data into an application's address space, they are not detected by the security products.

BRIEF SUMMARY

The above and other issues are addressed by a method, computer system, and computer-readable storage medium for detecting an attempted exploit of a vulnerability of an application executed by a computer. An embodiment of the method comprises hooking an application programming interface (API) of the application and monitoring for a call made to the hooked API. The method further comprises analyzing a parameter of the call to determine whether the parameter has a malicious characteristic indicating an attempt to use data within an address space of the application to execute malicious software (malware). The method additionally comprises performing a remediation action responsive to a determination that the parameter has the malicious characteristic.

An embodiment of the computer system comprises a non-transitory computer-readable storage medium storing executable computer program modules for performing steps. The steps comprise hooking an application programming interface (API) of the application and monitoring for a call made to the hooked API. The steps further comprise analyzing a parameter of the call to determine whether the parameter has a malicious characteristic indicating an attempt to use data within an address space of the application to execute malicious software (malware). The steps additionally comprise performing a remediation action responsive to a determination that the parameter has the malicious characteristic. The computer system also comprises a computer processor for executing the computer program modules.

An embodiment of the medium comprises a non-transitory computer-readable storage medium storing executable computer program modules for detecting an attempted exploit of a vulnerability of an application executed by a computer. The modules perform hooking an application programming interface (API) of the application and monitoring for a call made to the hooked API. The modules further perform analyzing a parameter of the call to determine whether the parameter has a malicious characteristic indicating an attempt to use data within an address space of the application to execute malicious software (malware). The modules additionally perform a remediation action responsive to a determination that the parameter has the malicious characteristic.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
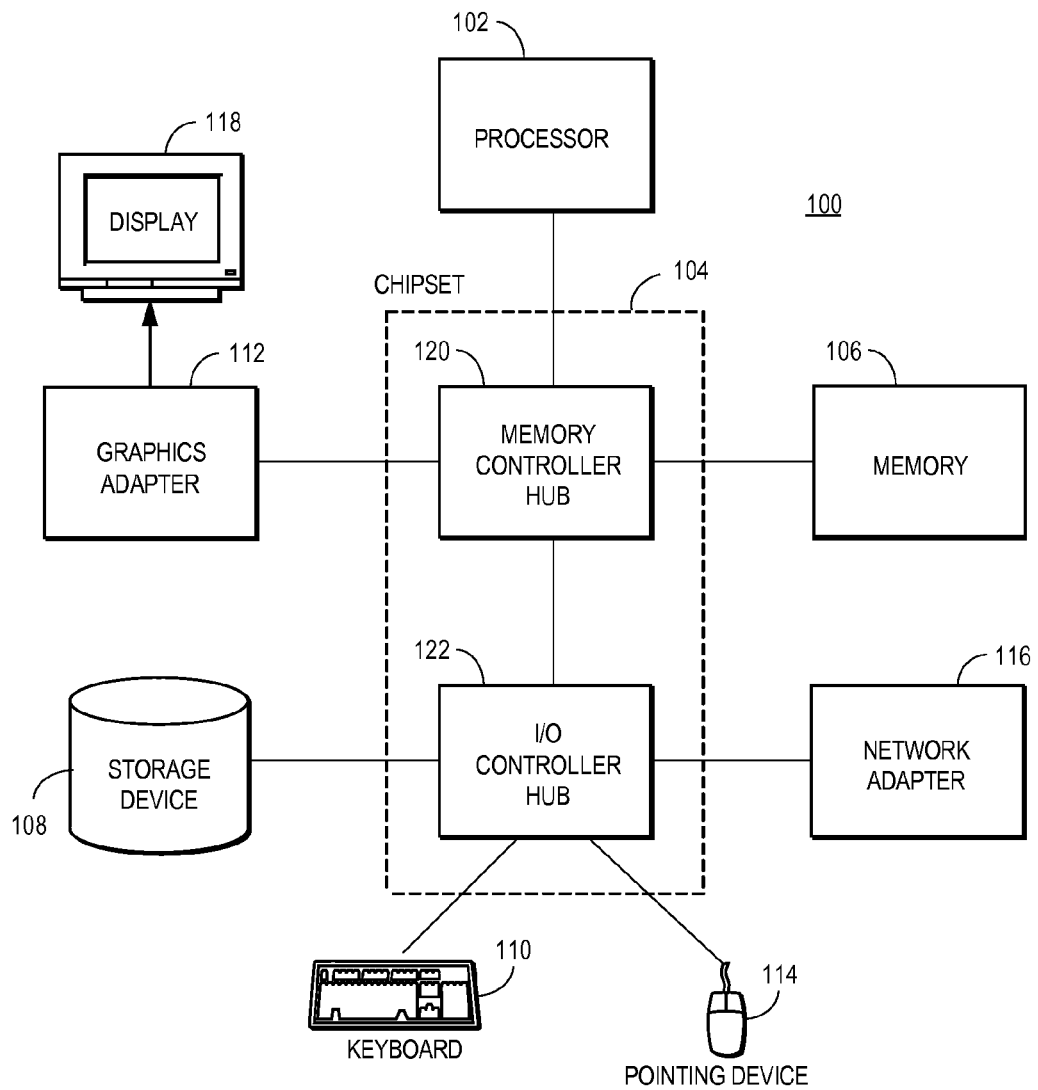
FIG. 1 is a high-level block diagram illustrating an example of a computer for executing a security module in accordance with one embodiment.

FIG. 1 is a high-level block diagram illustrating an example of a computer 100 for executing a security module in accordance with one embodiment. The computer 100, for example, can be a personal computer such as a desktop computer, laptop computer or tablet computer, or another network-capable device like a personal digital assistant (PDA), mobile telephone, pager, or television "set-top box." In one embodiment, the computer 100 is used by one or more users.

The illustrated computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display device 118 is coupled to the graphics adapter 112. A storage device 108, keyboard 110, pointing device 114, and network adapter 116 are coupled to the I/O controller hub 122. Other embodiments of the computer 100 have different architectures. For example, the memory 106 is directly coupled to the processor 102 in some embodiments.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is used in combination with the keyboard 110 to input data into the computer 100. The graphics adapter 112 displays images and other information on the display device 118. In some embodiments, the display device 118 includes touch screen capability for receiving user input and selections.

The network adapter 116 couples the computer system 100 to a network such as the Internet. For example, the network may connect the computer 100 to a security server that provides and updates a security module. The network may also connect the computer 100 to a variety of servers that provide websites and other functionality.

Some embodiments of the computer 100 have different and/or other components than those shown in FIG. 1. For example, the computer 100 can be formed of multiple blade servers and lack a display device, keyboard, and other components.

The computer 100 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 108, loaded into the memory 106, and executed by the processor 102.

In addition, this description uses the term "application" to refer to a program executed by the computer 100. The application can be part of an operating system executing on the computer, or independent of the operating system. The application is formed of one or more files that typically reside on the storage device 108 and are loaded into memory 106 when executed. At least one of the files loaded into memory 106 is referred to as the "executable image" and is executed as a process. The process includes an application programming interface (API) having functions (including methods) that can be called by other processes executing on the computer. A valid function call includes zero or more parameters that are passed to the called process for use by the called function.

Figure 2:
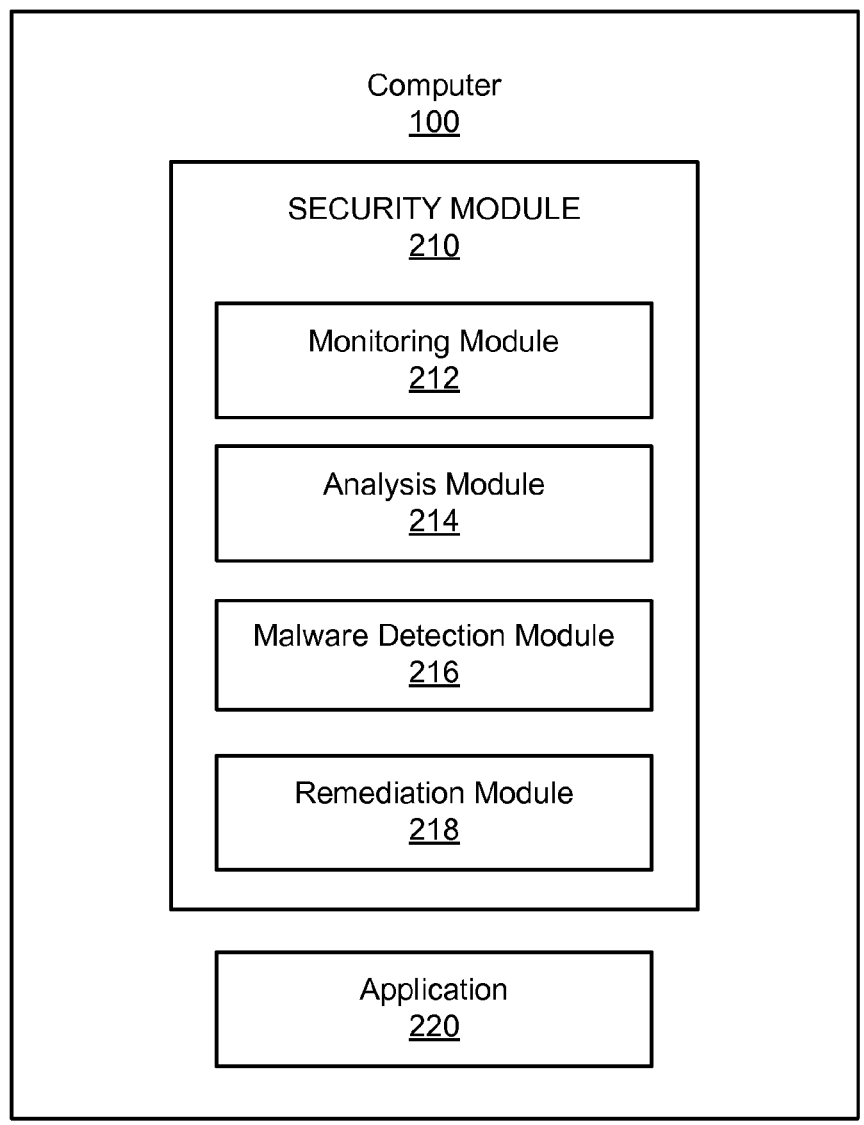
FIG. 2 is a high-level block diagram showing modules within the computer according to one embodiment.

FIG. 2 is a high-level block diagram showing modules within the computer 100 according to one embodiment. The modules include a security module 210 and an application module 220 (referred to herein as just an "application") such as a web browser, email program, word processor, spreadsheet, image viewer, or music player. Other embodiments can include different and/or other modules than those described here.

Assume that the application 220 has an interface for executing content received from a server via the network, stored on a local disk, or located elsewhere. In a common example, the application 220 is a web browser such as MICROSOFT INTERNET EXPLORER or MOZILLA FIREFOX that includes functionality for downloading web pages from a server and executing downloaded content.

The computer 100 may be attacked by receiving malware shell code within a malicious script on a seemingly-innocuous web page. When the script is executed by the computer 100, the shell code exploits a vulnerability of the browser or another application 220 to compromise the computer. Once the shell code gains control of the computer 100, it performs additional malicious actions such as downloading malware to the computer 100 from the network and/or executing malware previously downloaded to the computer.

In a particular exploit, the malware stores malicious code in a file on the computer 100 having a file name that is a substring of a string within the address space of the process for the application 220. The shell code calls a function in the API of the application 220 and passes a set of parameters to the application. A parameter references the substring within the address space of the application 220, and causes the application to load and execute the malicious code in the file. Thus, the malware exploits the vulnerability of the application without injecting or otherwise writing malicious code into the application's address space because the substring exists within the address space of the process for the application 220 before the call is made.

For example, if the application's address space contains the string "ntdll.dll," the malware stores malicious code in a file on the computer 100 named "dll.dll." The shell then makes a call to the application 220 that includes a parameter referencing a string starting at the third character of "ntdll.dll," i.e., "dll.dll." As a result of this call, the application 220 loads and executes the malicious code in the "dll.dll" file. The malicious code can then perform other malicious actions on the computer 100.

The security module 210 executes on the computer 100 to detect and report malware using a variety of techniques. In one embodiment, the security module 210 is configured to detect and block attacks that reference data within the address space of an application 220 like those described above. The security module 210 may also use malware definitions that describe signature strings and/or behaviors that, if detected on the computer 100, indicate the presence of malware. The security module 210 thus provides protection by preventing malware from compromising the computer 100.

In some embodiments the security module 210 is incorporated into an operating system executing on the computer 100 while in other embodiments the security module is a standalone application or part of another product. As shown, the security module 210 itself includes multiple modules. Those of skill in the art will recognize that other embodiments of the security module 210 can have different and/or other modules than the ones described here, and that the functionalities can be distributed among the modules in a different manner.

A monitoring module 212 within the security module 210 hooks APIs of applications 220 to enable transfer of control flow from the applications to the security module 210 at certain points during the applications' executions. In one embodiment, the monitoring module 212 identifies applications 220 on the computer 100 that have vulnerabilities that can be exploited by malicious code in content received via a network or from other sources. The monitoring module 212 hooks function calls in the APIs of these applications at locations which allow the security module 210 to detect malware exploiting the applications' vulnerabilities.

The specific APIs and functions hooked by the monitoring module 212 vary in different embodiments. An embodiment of the monitoring module 212 receives a list of applications, exploitable vulnerabilities, and hooking locations from the developer of the security module 210 and/or from another source and compares the applications in the list with the applications installed on the computer 100. The monitoring module 212 hooks the specified locations of the installed applications. In another embodiment, the monitoring module 212 hooks any API functions that can be called to pass parameters to an application.

In one embodiment, the monitoring module 212 installs a hook by replacing one or more instructions in the application's instruction stream with a jump instruction or other similar instruction that redirects control flow to the security module 210. In one embodiment, executing the hook causes the monitoring module 212 to save the state of the computer 100, including the parameters of the hooked function call, for subsequent analysis. If the analysis fails to detect malware, an embodiment of the monitoring module 212 restores the original state of the computer 100 and transfers the control flow back to the hooked application 220 by executing the original instructions that were replaced when the hook was installed.

An analysis module 214 analyzes the parameters of hooked function calls for evidence that malware is attempting to exploit vulnerabilities of applications 220. In one embodiment, the analysis module 214 is activated when a hooked function is called by another process. The analysis module 214 determines whether the parameters being passed to the function by the calling process have characteristics indicating an attempt to use data within the called application's address space to execute malware.

A malware detection module 216 uses the results from the analysis module 214 to determine if the process that called the hooked function is malware. In one embodiment, the malware detection module 216 makes the determination based on results from multiple different types of analyses. For example, the malware detection module 216 can also consider the reputation of the process that called the hooked function, whether the process engaged in other suspicious behaviors, whether the process is digitally signed, whether the process is on a whitelist of known legitimate applications, and/or whether a string signature of known malware is found within the process. Based on these considerations, the malware detection module 216 declares the calling process malicious or legitimate.

A remediation module 218 performs one or more remediation actions for detected malware. The remediation actions vary in different embodiments. In one embodiment, the remediation module 218 performs an action that blocks the malware from compromising the computer 100. These actions may include terminating the calling and/or called process, and deleting a malicious file stored on the computer. The remediation actions may also include reporting the malware detection to a user of the computer and/or to a security server via the network.

Figure 3:
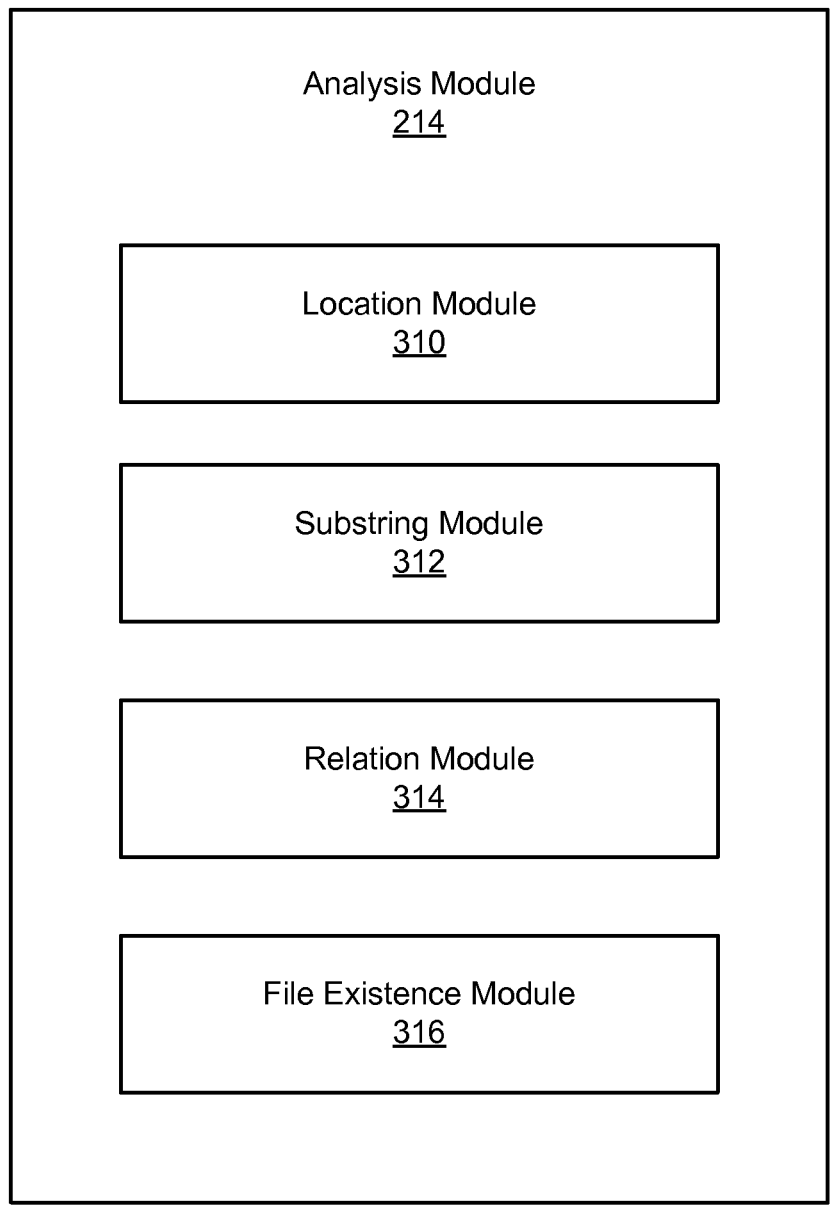
FIG. 3 is a high-level block diagram illustrating a detailed view of the analysis module of the security module according to one embodiment.

FIG. 3 is a high-level block diagram illustrating a detailed view of the analysis module 214 of the security module 210 according to one embodiment. In FIG. 3, the analysis module 214 contains a location module 310, a substring module 312, a relation module 314 and a file existence module. These modules use various techniques to analyze aspects of API call parameters to determine if the call is attempting to exploit a vulnerability. Other embodiments can include different and/or other modules for analyzing API call parameters.

The location module 310 determines whether a parameter of the call references an abnormal location in the called application's address space. Normally, a parameter that supplies a string will reference a location in the resource or string sections of the address space (i.e., of the portable executable file loaded into the address space as the executable image), or pass the string on the processor stack. An attacker, in contrast, may reference a string in an abnormal location, such the header section, perhaps because the string required for the attack is found only in that location. If the call parameter references an abnormal location, the location module 310 flags the call as having a suspicious characteristic.

The substring module 312 determines whether a parameter of the call references a location in the called application's address space holding substring of a full string. In one embodiment, strings stored in the address space, on the stack, and elsewhere are bounded by null characters. The substring module 312 thus determines whether the string contained within the location referenced by the parameter has bounding null characters. If the characters bounding the string are not null, the location module 312 flags the call as having suspicious characteristics.

The relation module 314 determines whether a parameter of the call references data at a location having no apparent relationship with the called application. Typically, the data referenced by a parameter is located either within the executable image of the called application, or within another related module used by the application (e.g., within a DLL file loaded into the address space by the application). It is unusual for a parameter to reference data from a different location. Therefore, if the parameter references data at a location having no apparent relationship with the called application, the relation module 314 flags the call as having suspicious characteristics.

The file existence module 316 determines whether a parameter of the call references a data string having the same name as a file on the storage device 108 of the computer 100. In one embodiment, the file existence module 316 interacts with the substring module 312 to determine whether the data string referenced by the parameter is a substring of a full string. If the data string is a substring, the file existence module 316 determines whether a file having the same name as the full string exists on the storage device 108 of the computer 100. If the file exists, the file existence module 316 flags the call as having suspicious characteristics because it is unusual for a call parameter to reference only part of the name of a file stored by the computer 100 and it is likely that the call is attempting to load malware.

In one embodiment, the file existence module 316 determines whether a file having the same name as the substring is stored on the storage device 108. If the file with the substring name exists, the file existence module 316 examines the file for characteristics indicating whether it is malicious. For example, the file existence module 316 may determine the creation date of the file. If the file was created recently, this characteristic indicates that the file is potentially malicious because it might have been created by malware that recently entered the computer 100. On the other hand, if the file creation was not recent, this characteristic suggests that the file is not malicious.

The check of whether the file with the substring name exists can serve as a false positive mitigation test for the file existence module 316. If a file with the full string name exists, and the file with the substring name exists and lacks malicious characteristics, an embodiment the file existence module 316 does not flag the call as having suspicious characteristics because the file with the substring name might be legitimate.

Figure 4:
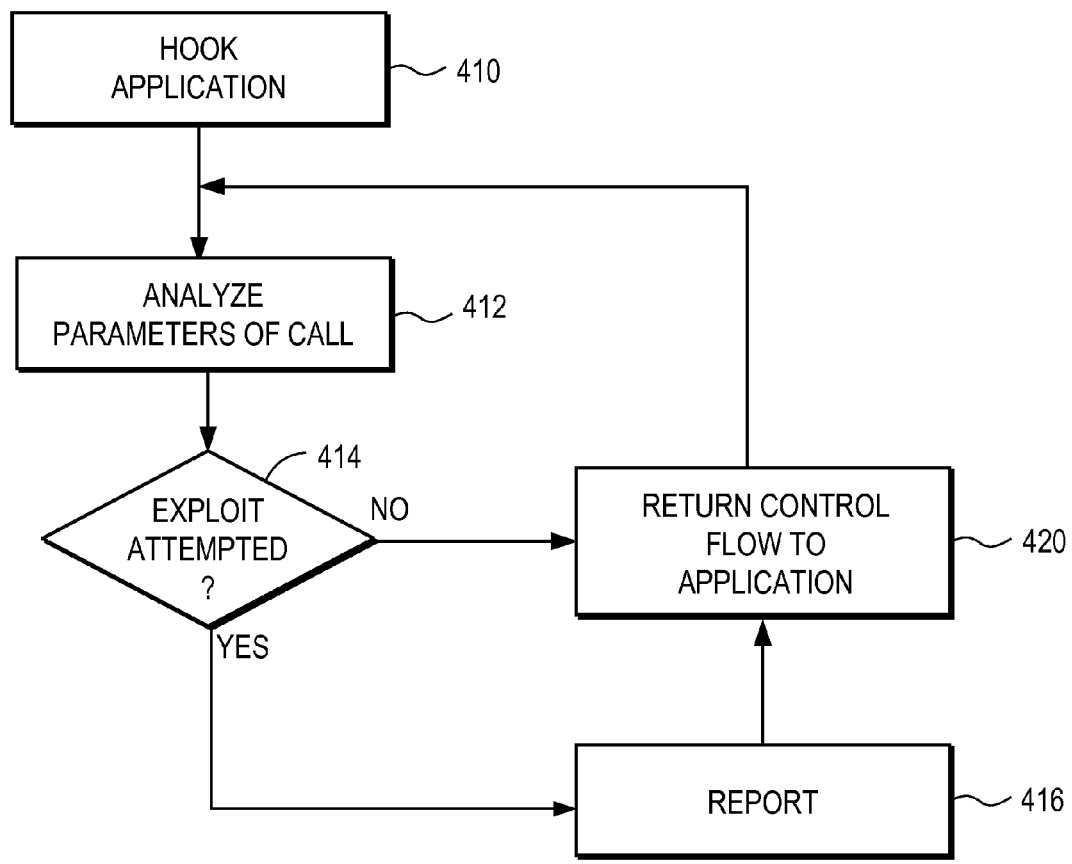
FIG. 4 is a flowchart illustrating steps performed by the security module to provide security to the computer 100 according to one embodiment.

FIG. 4 is a flowchart illustrating steps performed by the security module 210 to provide security to the computer 100 according to one embodiment. Other embodiments perform the illustrated steps in different orders, and/or perform different or additional steps. Moreover, some or all of the steps can be performed by modules other than the security module 210.

The security module 210 hooks 410 function calls in the API of an application 220 on the computer 100. In one embodiment, the security module 210 hooks the application when the executable image is loaded into memory by the computer 100. The hook transfers control flow to the security module 210 if a hooked function is called. In one embodiment, when a hook is followed and control flow passes to the security module 210, the security module saves the state of the computer 100, including the parameters of the hooked call.

In one embodiment, the analysis module 214 of the security module 210 analyzes 412 the parameters of the hooked call for evidence indicating that a vulnerability in the application 220 is being exploited. This analysis 412 may include determining whether a parameter references data in an abnormal location in the application's address space and whether a parameter references a substring of a full string in the address space. The analysis 412 may also include determining whether a parameter of the call references data at a location having no apparent relationship with the called application, and whether files having the substring and/or full string names are stored by the computer 100. In one embodiment, the security module 210 combines the results of the call analyses with results of other analyses of the computer 100 to determine 414 whether the function call is malicious (i.e., attempting to exploit a vulnerability of the application). If the security module 210 determines that the call is not malicious, the security module returns 420 control flow to the application. On the other hand, if the security module 210 determines that the call is malicious, it performs one or more remediation actions such as blocking the exploit and notifying the computer user.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for discovering documents sharing common underlying structures in a large collection of documents and processing the documents using the discovered structures. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

The invention claimed is:

1. A method for detecting an attempted exploit of a vulnerability of an application executed by a computer, comprising:
   hooking an application programming interface (API) of the application;
   monitoring for a call made to the hooked API;
   analyzing a parameter of the call to identify data existing within the address space of the application before the call is made referenced by the parameter of the call;
   analyzing the referenced data existing within the address space of the application to determine whether the parameter has a malicious characteristic indicating that the call is an attempt to use the data existing within the address space of the application to execute malicious software (malware); and
   performing a remediation action responsive to a determination that the parameter has the malicious characteristic.

2. The method of claim 1, wherein hooking the API of the application comprises altering control flow of a function in the API to call a security module executing on the computer.

3. The method of claim 1, wherein analyzing the referenced data comprises:
   determining whether the referenced data are at an abnormal location in the application's address space; and
   determining that the parameter has the malicious characteristic responsive to a determination that the referenced data are at the abnormal location.

4. The method of claim 3, wherein the abnormal location comprises a header of a portable executable file loaded in the address space.

5. The method of claim 1, wherein analyzing the referenced data comprises determining whether the referenced data are a substring of a full string in the address space of the application.

6. The method of claim 5, wherein determining whether the referenced data are a substring of a full string comprises determining whether a string contained within a location referenced by the parameter is bounded by null characters.

7. The method of claim 5, further comprising:
   determining whether a file stored by the computer has a same name as the full string; and
   determining that the parameter has the malicious characteristic responsive to the file stored by the computer having the same name as the full string.

8. The method of claim 1, further comprising:
   determining whether a second parameter of the call references data at a location having no apparent relationship with the application; and
   determining that the second parameter has the malicious characteristic responsive to the second parameter referencing data at the location having no apparent relationship with the application.

9. The method of claim 1, further comprising:
   determining whether a file stored by the computer has a same name as a data string referenced by the parameter.

10. The method of claim 9, further comprising analyzing the file stored by the computer for malicious characteristics.

11. The method of claim 1, wherein performing a remediation action comprises:
blocking the attempt to execute malware.

12. A computer system for detecting an attempted exploit of a vulnerability of an application executed by a computer, comprising:
a non-transitory computer-readable storage medium storing executable computer program modules for performing steps comprising:
hooking an application programming interface (API) of the application;
monitoring for a call made to the hooked API;
analyzing a parameter of the call to identify data existing within the address space of the application before the call is made referenced by the parameter of the call;
analyzing the referenced data existing within the address space of the application to determine whether the parameter has a malicious characteristic indicating that the call is an attempt to use the data existing within the address space of the application to execute malicious software (malware); and
performing a remediation action responsive to a determination that the parameter has the malicious characteristic; and
a computer processor for executing the computer program modules.

13. The computer system of claim 12, wherein analyzing the referenced data comprises:
determining whether the referenced data are at an abnormal location in the application's address space; and
determining that the parameter has the malicious characteristic responsive to a determination that the referenced data are at the abnormal location.

14. The computer system of claim 12, wherein analyzing the referenced data comprises determining whether the referenced data are a substring of a full string in the address space of the application.

15. The computer system of claim 12, further comprising:
determining whether a file stored by the computer has a same name as a data string referenced by the parameter.

16. A non-transitory computer-readable storage medium storing executable computer program modules for detecting an attempted exploit of a vulnerability of an application executed by a computer, the modules executable to perform steps comprising:
hooking an application programming interface (API) of the application;
monitoring for a call made to the hooked API;
analyzing a parameter of the call to identify data existing within the address space of the application before the call is made referenced by the parameter of the call;
analyzing the referenced data existing within the address space of the application to determine whether the parameter has a malicious characteristic indicating that the call is an attempt to use the data existing within the address space of the application to execute malicious software (malware); and
performing a remediation action responsive to a determination that the parameter has the malicious characteristic.

17. The medium of claim 16, wherein analyzing the referenced data comprises:
determining whether the referenced data are at an abnormal location in the application's address space; and
determining that the parameter has the malicious characteristic responsive to a determination that the referenced data are at the abnormal location.

18. The medium of claim 16, wherein analyzing the referenced data comprises determining whether the referenced data are a substring of a full string in the address space of the application.

19. The medium of claim 16, Further comprising:
determining whether a file stored by the computer has a same name as a data string referenced by the parameter.

* * * * *